US009395503B2

(12) United States Patent
Lin

(10) Patent No.: US 9,395,503 B2
(45) Date of Patent: Jul. 19, 2016

(54) OPTICAL-ELECTRIC COUPLING ELEMENT AND OPTICAL CONNECTOR USING SAME

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 8 days.

(21) Appl. No.: 13/972,837

(22) Filed: Aug. 21, 2013

(65) Prior Publication Data

US 2014/0341507 A1    Nov. 20, 2014

(30) Foreign Application Priority Data

May 15, 2013   (TW) ............................... 102117269 A

(51) Int. Cl.
*G02B 6/42*  (2006.01)
(52) U.S. Cl.
CPC .............. *G02B 6/4204* (2013.01); *G02B 6/428* (2013.01); *G02B 6/4214* (2013.01)
(58) Field of Classification Search
CPC ..... G02B 6/4204; G02B 6/4214; G02B 6/428
USPC ..................................................... 385/14, 33
See application file for complete search history.

(56) References Cited

U.S. PATENT DOCUMENTS

| 5,515,468 | A  | * | 5/1996  | DeAndrea et al. ............... 385/88 |
| 6,034,821 | A  | * | 3/2000  | Schenfeld et al. ............ 359/618 |
| 8,554,026 | B2 | * | 10/2013 | Chang et al. .................... 385/14 |
| 2002/0196997 | A1 | * | 12/2002 | Chakravorty et al. .......... 385/14 |
| 2005/0175347 | A1 | * | 8/2005  | Ray et al. ........................ 398/88 |
| 2006/0177184 | A1 | * | 8/2006  | Basavanhally et al. ......... 385/89 |
| 2011/0235967 | A1 | * | 9/2011  | Chang et al. .................... 385/27 |
| 2013/0004167 | A1 | * | 1/2013  | Kim ............................... 398/43 |

* cited by examiner

*Primary Examiner* — Peter Radkowski
(74) *Attorney, Agent, or Firm* — ScienBiziP, P.C.

(57) ABSTRACT

An optical-electric coupling element includes a lower surface, an upper surface, and a first side surface. The lower surface defines a first cavity. The first cavity includes a bottom portion forming a first photic zone and a second photic zone. The first photic zone includes first coupling lenses. The second photic zone includes second coupling lenses. The upper surface defines a second cavity. The second cavity includes a sloped surface. The first side surface defines a receiving cavity. The receiving cavity includes a vertical surface forming a third photic zone and a fourth photic zone. The third photic zone includes third coupling lenses. The fourth photic zone includes fourth coupling lenses. Each third coupling lens corresponds with a respective one of the first coupling lenses. Each fourth coupling lens corresponds with a respective one of the second coupling lenses.

12 Claims, 4 Drawing Sheets

OPTICAL-ELECTRIC COUPLING ELEMENT AND OPTICAL CONNECTOR USING SAME

BACKGROUND

1. Technical Field

The present disclosure relates to an optical-electric coupling element and an optical connector using the same.

2. Description of Related Art

Optical connectors typically include a number of photoelectric conversion chips, such as two laser diodes or photo diodes, and a number of optical fibers. The photoelectric conversion chips emit or receive light carrying data to or from the optical fiber for data transmission. In certain circumstances, the light path between the photoelectric conversion chip and the optical fiber must be bent about 90 degrees to reduce a length or height of the optical connector. This may be achieved by a reflective mirror tilted at 45 degrees with respect to the photoelectric conversion chip and the optical fiber. However, the essential step of accurately aligning the reflective mirror with the photoelectric conversion chip is a complex and difficult process.

Therefore, it is desirable to provide an optical-electric coupling element and an optical connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
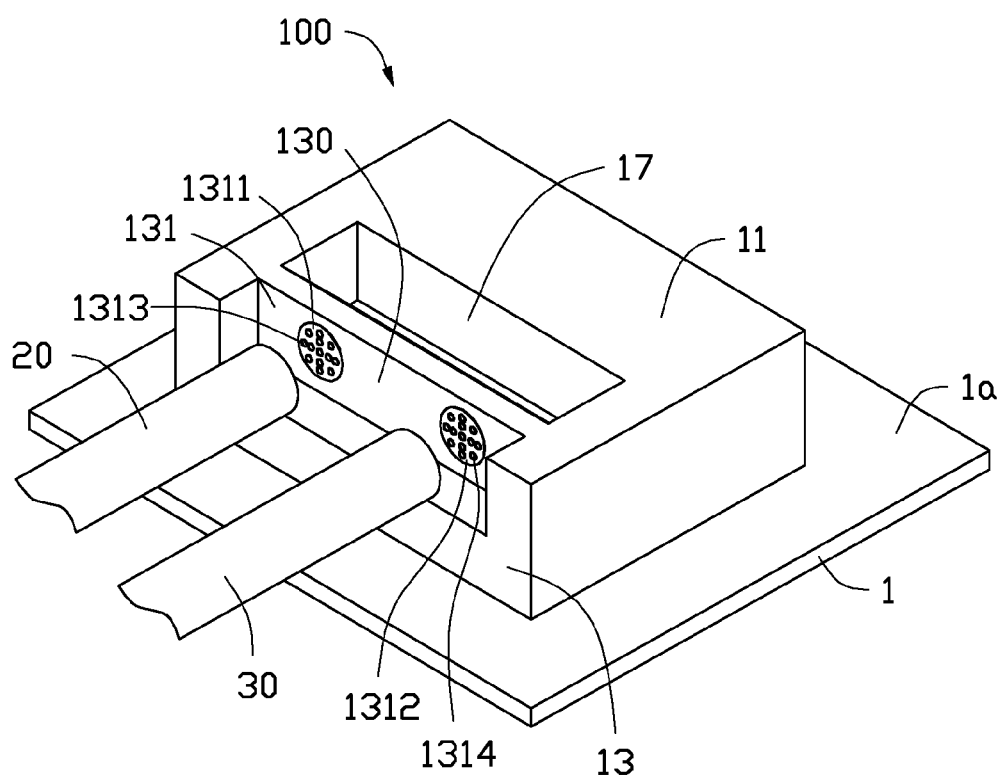
FIG. 1 is an assembled, isometric view of an optical connector, according to an exemplary embodiment.
Figure 2:
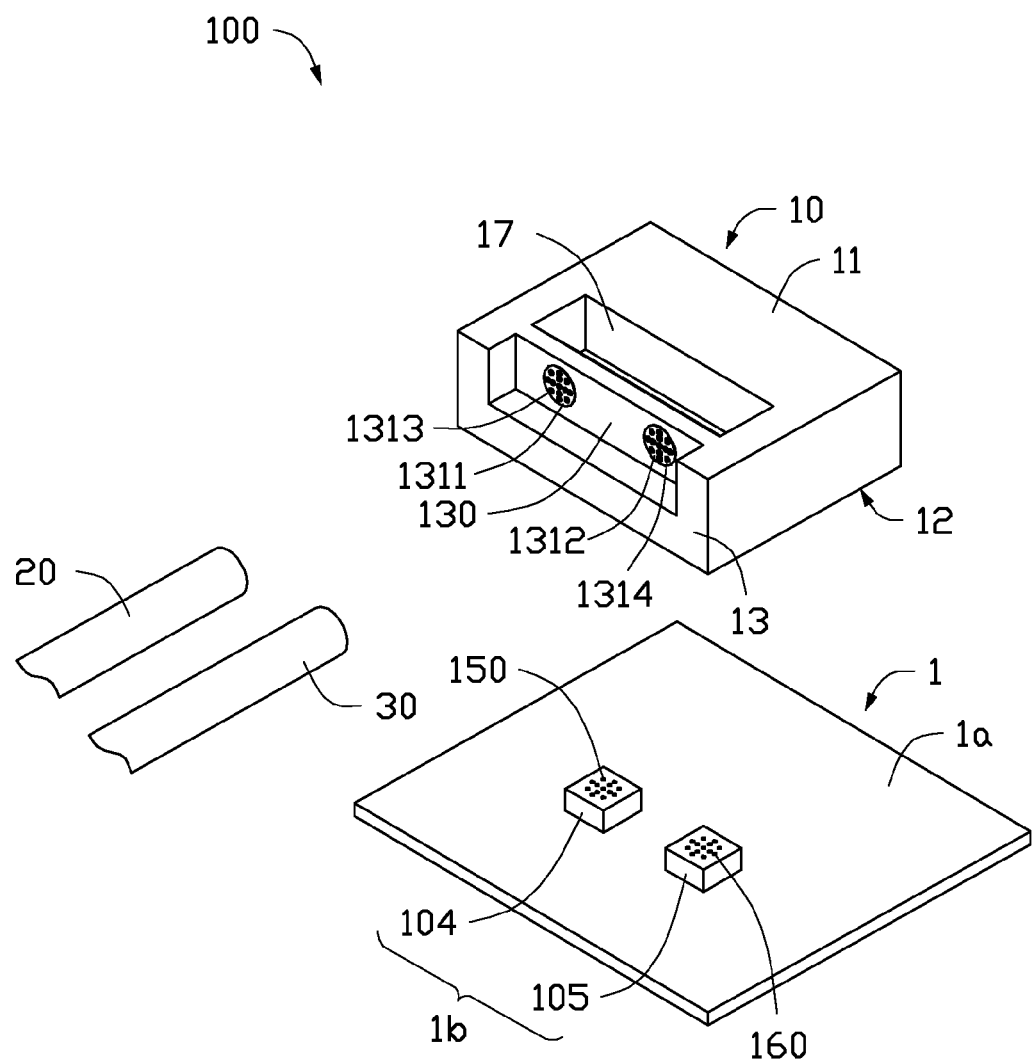
FIG. 2 is an exploded, isometric view of the optical connector of FIG. 1.
Figure 3:
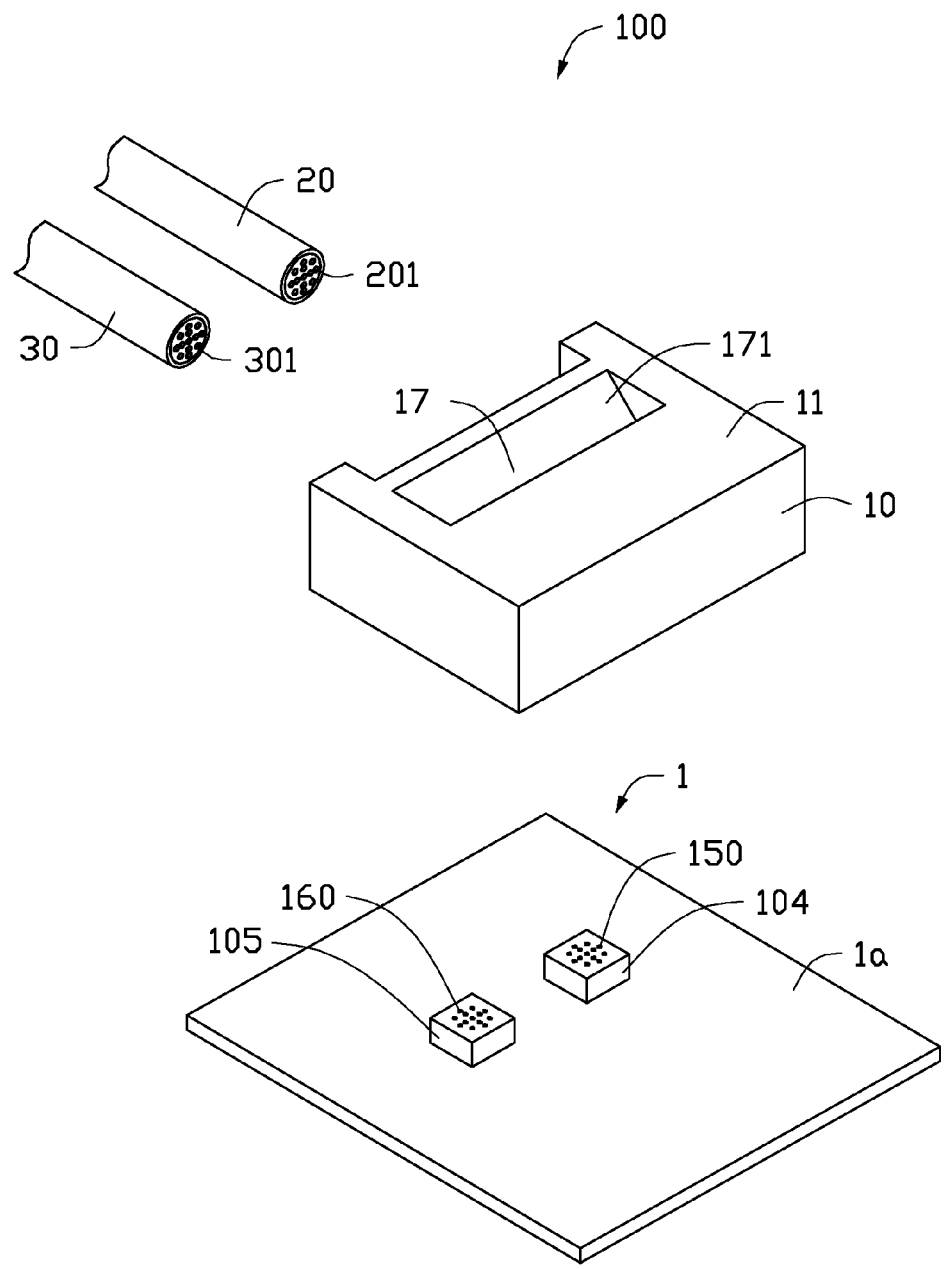
FIG. 3 is similar to FIG. 2, but viewed from a first angle.
Figure 4:
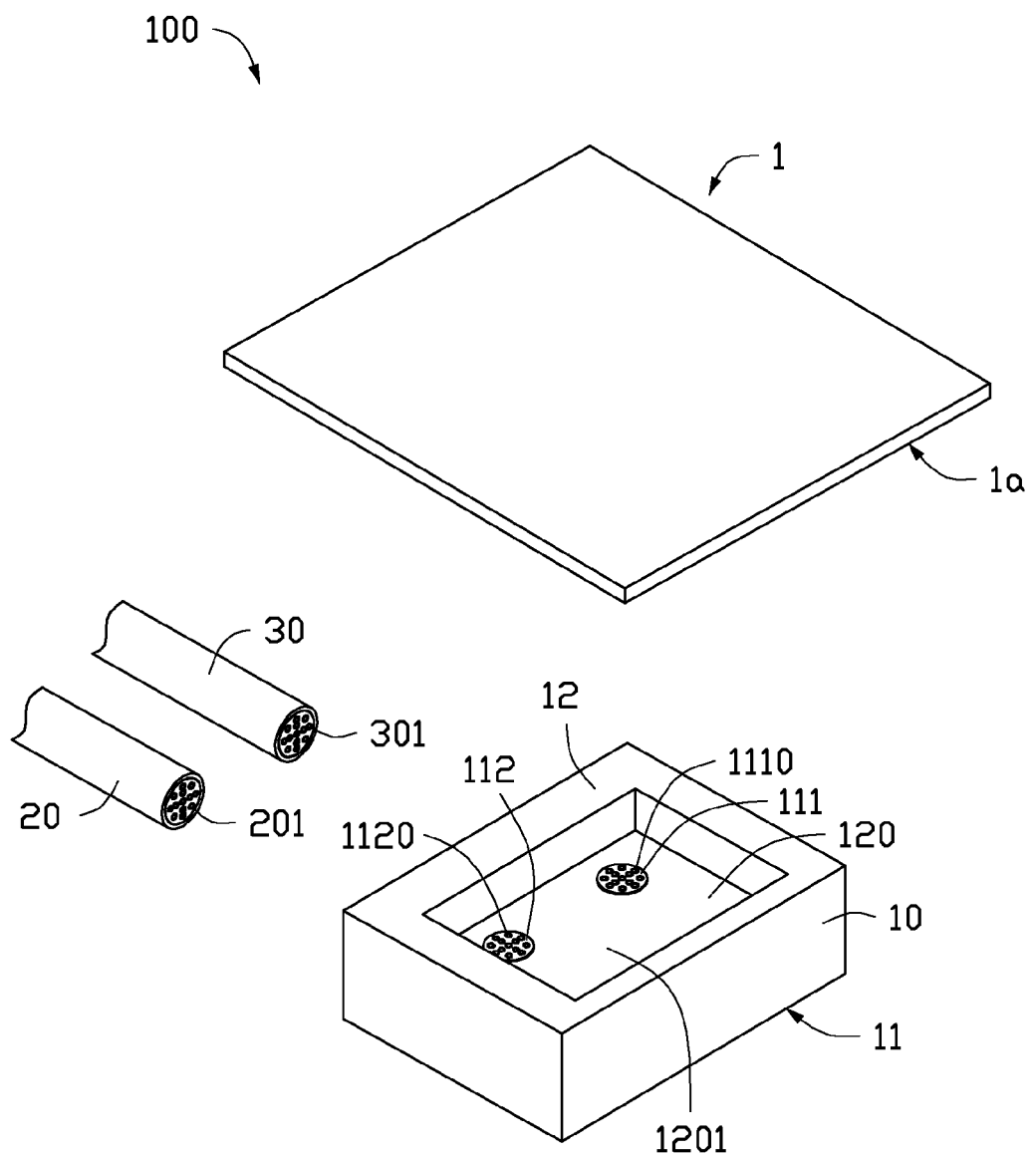
FIG. 4 is similar to FIG. 3, but viewed from a second angle.

FIGS. 1-4 show an optical connector 100, according to an embodiment. The optical connector 100 includes a printed circuit board (PCB) 1, an optical-electric coupling element 10, an output optical fiber 20, and an input optical fiber 30. The optical-electric coupling element 10 is positioned on the PCB 1. The output optical fiber 20 and the input optical fiber 30 are connected to the optical-electric coupling element 10.

The PCB 1 includes a supporting surface 1a. A photoelectric conversion module 1b is positioned on the supporting surface 1a and electrically connected to the PCB 1. The photoelectric conversion module 1b includes two photoelectric conversion chips, such as a light emitting unit 104 and a light receiving unit 105. The light emitting unit 104 includes a number of laser diodes 150. The light receiving unit 105 includes a number of photo diodes 160. The PCB 1 contains various circuits (not shown) that connect with the photo electric conversion module 1b, to drive the laser diodes 150 to emit light according to input for transmitting the input data, and for the demodulation of data in the light received by the photo diodes 160.

The optical-electric coupling element 10 is cuboid, and includes an upper surface 11, a lower surface 12 facing away from the upper surface 11, and a first side surface 13. The upper surface 11 is substantially parallel with the first lower surface 12. The first side surface 13 substantially perpendicularly connects the upper surface 11 to the lower surface 12. The optical-electric coupling element 10 defines a first cavity 120 in the lower surface 12. A bottom portion 1201 of the first cavity 120 forms a first photic zone 111 and a second photic zone 112. The lower surface 12 is positioned on the supporting surface 1a of the PCB 1, with the first photic zone 111 aligning with the light emitting unit 104, and the second photic zone 112 aligning with the light receiving unit 105. The first photic zone 111 includes a number of first coupling lenses 1110. Each first coupling lens 1110 corresponds with a laser diode 150. The second photic zone 112 includes a number of second coupling lenses 1120. Each second coupling lens 1120 corresponds with a photo diode 160.

The optical-electric coupling element 10 also defines a second cavity 17 in the upper surface 11. The second cavity 17 includes a sloped surface 171 directly connected to the upper surface 11. An included angle between the upper surface 11 and the sloped surface 171 is about 45 degrees. An included angle between an optical axis of each first coupling lens 150 and the sloped surface 171 is therefore about 45 degrees. An included angle between an optical axis of each second coupling lens 160 and the sloped surface 171 is also about 45 degrees.

The optical-electric coupling element 10 defines a receiving cavity 130 in the first side surface 13. The receiving cavity 130 includes a vertical surface 131 substantially perpendicular to the upper surface 11.

The vertical surface 131 forms a third photic zone 1311 and a fourth photic zone 1312. The third photic zone 1311 includes a number of third coupling lenses 1313. The fourth photic zone 1312 includes a number of fourth coupling lenses 1314. An included angle between an optical axis of each third coupling lens 1313 and the sloped surface 171 is also about 45 degrees. An included angle between an optical axis of each fourth coupling lens 1314 and the sloped surface 171 is therefore about 45 degrees. Each third coupling lens 1313 corresponds with a first coupling lens 1110. Each fourth coupling lens 1314 corresponds with a second coupling lens 1120.

The output optical fiber 20 is a multi-core fiber (MCF), and includes a number of first fiber cores 201. Each first fiber cores 201 corresponds to a third coupling lens 1313.

The input optical fiber 30 is also a MCF, and includes a number of second fiber cores 301. Each second fiber cores 301 corresponds to a fourth coupling lens 1314.

In use, light beams emitted from the laser diodes 104 are directed into the optical-electric coupling element 10 by the third coupling lenses 1313, then the light paths are bent about 90 degrees by the sloped surface 171 to the third coupling lens 1313. In the embodiment, the output optical fiber 20 is positioned on the light path reflected by the sloped surface 171 from the laser diodes 104. As such, the light beams are then reflected into the third coupling lens 1313 by the sloped surface 17, and finally enter into the first fiber cores 201 of the output optical fiber 20. A process of the photo diodes 105 receiving light beams is the reverse to that of the laser diodes 104 emitting light beams.

In other embodiments, the numbers of the laser diodes 104, the photo diodes 105, the first coupling lenses 1110, the second coupling lenses 1120, the third coupling lenses 1313, and the fourth coupling lenses 1314 can be changed depending on need.

It will be understood that the above particular embodiments are shown and described by way of illustration only. The principles and the features of the present disclosure may be employed in various and numerous embodiment thereof without departing from the scope of the disclosure as claimed.

The above-described embodiments illustrate the possible scope of the disclosure but do not restrict the scope of the disclosure.

What is claimed is:

1. An optical-electric coupling element comprising:
   a lower surface defining a first cavity, the first cavity comprising a bottom portion forming a first photic zone and a second photic zone, the first photic zone comprising a plurality of first coupling lenses, the second photic zone comprising a plurality of second coupling lenses;
   an upper surface facing away from the lower surface, and defining a second cavity, the second cavity comprising a sloped surface directly connected to the upper surface; and
   a first side surface substantially perpendicularly connecting the upper surface to the lower surface, and defining a receiving cavity, the receiving cavity facing and being exposed out of the upper surface and the first side surface for receiving optical fibers, the receiving cavity comprising a vertical surface substantially perpendicular to the upper surface, the vertical surface forming a third photic zone and a fourth photic zone, the third photic zone comprising a plurality of third coupling lenses, the fourth photic zone comprising a plurality of fourth coupling lenses, each third coupling lens corresponding a respective one of the first coupling lenses, each fourth coupling lens corresponding a respective one of the second coupling lenses, and each third coupling lens corresponding to a respective one of the optical fibers dived into the receiving cavity, each fourth coupling lens corresponding to a respective one of the optical fibers dived into the receiving cavity.

2. The optical-electric coupling element of claim 1, wherein an included angle between the upper surface and the sloped surface is about 45 degrees.

3. The optical-electric coupling element of claim 1, wherein an included angle between an optical axis of each first coupling lens and the sloped surface is therefore about 45 degrees.

4. The optical-electric coupling element of claim 1, wherein an included angle between an optical axis of each second coupling lens and the sloped surface is also about 45 degrees.

5. The optical-electric coupling element of claim 1, wherein an included angle between an optical axis of each third coupling lens and the sloped surface is about 45 degrees.

6. The optical-electric coupling element of claim 1, wherein an included angle between an optical axis of each fourth coupling lens and the sloped surface is about 45 degrees.

7. An optical connector, comprising:
   a printed circuit board (PCB) comprising a supporting surface, a light emitting unit, and a light receiving unit, the light emitting unit and the light receiving unit positioned on the supporting surface, the light emitting unit comprising a plurality of laser diodes, the light receiving unit comprising a plurality of photo diodes;
   an optical-electric coupling element comprising:
      a lower surface supported on the supporting surface, and defining a first cavity receiving the light emitting unit and the light receiving unit, the first cavity comprising a bottom portion forming a first photic zone and a second photic zone, the first photic zone comprising a plurality of first coupling lenses, each first coupling lens aligning with a respective one of the laser diodes, the second photic zone comprising a plurality of second coupling lenses, each second coupling lens aligning with a respective one of the photo diodes;
      an upper surface facing away from the lower surface, and defining a second cavity, the second cavity comprising a sloped surface directly connected to the upper surface; and
      a first side surface substantially perpendicularly connecting the upper surface to the lower surface, and defining a receiving cavity, the receiving cavity facing and being exposed out of the upper surface and the first side surface for receiving optical fibers, the receiving cavity comprising a vertical surface substantially perpendicular to the upper surface, the vertical surface forming a third photic zone and a fourth photic zone, the third photic zone comprising a plurality of third coupling lenses, the fourth photic zone comprising a plurality of fourth coupling lenses, each third coupling lens corresponding a respective one of the first coupling lenses, each fourth coupling lens corresponding a respective one of the second coupling lenses;
   an output optical fiber comprising a plurality of first fiber cores, each of the first fiber cores diving into the receiving cavity and corresponding to a respective one of the third coupling lenses; and
   an input optical fiber comprising a plurality of second fiber cores, each of the second fiber cores diving into the receiving cavity and corresponding to a respective one of the fourth coupling lenses.

8. The optical connector of claim 7, wherein an included angle between the upper surface and the sloped surface is about 45 degrees.

9. The optical connector of claim 7, wherein an included angle between an optical axis of each first coupling lens and the sloped surface is therefore about 45 degrees.

10. The optical connector of claim 7, wherein an included angle between an optical axis of each second coupling lens and the sloped surface is also about 45 degrees.

11. The optical connector claim 7, wherein an included angle between an optical axis of each third coupling lens and the sloped surface is about 45 degrees.

12. The optical connector of claim 7, wherein an included angle between an optical axis of each fourth coupling lens and the sloped surface is about 45 degrees.

\* \* \* \* \*